(12) United States Patent
Kirkpatrick

(10) Patent No.: US 10,006,156 B2
(45) Date of Patent: Jun. 26, 2018

(54) SYSTEMS AND METHODS FOR CALCULATED TOW FIBER ANGLE

(71) Applicant: Goodrich Corporation, Charlotte, NC (US)

(72) Inventor: Christopher T. Kirkpatrick, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 998 days.

(21) Appl. No.: 14/222,313

(22) Filed: Mar. 21, 2014

(65) Prior Publication Data
US 2015/0267329 A1    Sep. 24, 2015

(51) Int. Cl.
*D04H 3/00*    (2012.01)
*B29B 11/16*    (2006.01)
(Continued)

(52) U.S. Cl.
CPC .............. *D04H 3/00* (2013.01); *B29B 11/16* (2013.01); *B29C 70/202* (2013.01); *B32B 5/022* (2013.01); *B32B 5/024* (2013.01); *B32B 5/12* (2013.01); *B32B 5/26* (2013.01); *D04H 1/4242* (2013.01); *B32B 2307/54* (2013.01); *B32B 2307/542* (2013.01); *B32B 2605/00* (2013.01); *D10B 2101/12* (2013.01); *Y10T 428/21* (2015.01)

(58) Field of Classification Search
CPC .... D04H 3/00; D04H 1/4242; D04H 2307/54; D04H 2307/542; D04H 2605/00; B32B 5/12; B32B 5/024; B32B 5/26; B32B 5/022; B32B 2307/54; B32B 2307/542; B32B 2605/00; B29B 11/16; Y10T 428/21; D10B 2101/12; B29C 70/202

USPC ....................... 428/105, 112, 113, 64.1, 66.7
See application file for complete search history.

(56) References Cited

U.S. PATENT DOCUMENTS

| | | | | |
|---|---|---|---|---|
| 3,632,460 A | * | 1/1972 | Palfreyman | B29C 70/04 156/169 |
| 5,217,770 A | * | 6/1993 | Morris, Jr. | C04B 35/80 156/148 |
| 6,009,605 A | * | 1/2000 | Olry | B29B 11/16 28/107 |

FOREIGN PATENT DOCUMENTS

| | | |
|---|---|---|
| EP | 2502733 | 9/2012 |
| WO | 2005111292 | 11/2005 |
| WO | 2009062749 | 5/2009 |

OTHER PUBLICATIONS

Tailored Fiber Placement—LayStitch Automated Fiber Placement Machines; p. 2; obtained Mar. 21, 2014 at http://www.tailoredfiberplacement.com.

(Continued)

*Primary Examiner* — Elizabeth M Cole
(74) *Attorney, Agent, or Firm* — Snell & Wilmer L.L.P.

(57) ABSTRACT

An optimized fiber tow orientation, to achieve substantially uniform fiber tow volume across the web, e.g., from inner diameter (ID) to the outer diameter (OD) of a disc shaped preform, without substantially varying the angles of the plurality of fiber tows radially or circumferentially is described herein. Utilizing the systems and processes described herein, a net shape preform may be created. A substantially continuous fiber tow may be used to form the preform. The fiber tow angle of each fiber tow may vary, from more radial, such as at the ID, to more tangential, such as at the OD, as the radius increases, such that there is substantially uniform thickness and substantially uniform areal weight from ID to OD of the preform or layer.

11 Claims, 5 Drawing Sheets

(51) Int. Cl.
*D04H 1/4242* (2012.01)
*B32B 5/02* (2006.01)
*B32B 5/12* (2006.01)
*B32B 5/26* (2006.01)
*B29C 70/20* (2006.01)

(56) References Cited

OTHER PUBLICATIONS

Communication pursuant to Article 94(3) EPC dated Mar. 24, 2017 in European Application No. 15158448.9.
Extended European Search Report dated Jul. 27, 2015 in European Application No. 15158448.9.

\* cited by examiner

SYSTEMS AND METHODS FOR CALCULATED TOW FIBER ANGLE

FIELD

This disclosure generally relates to textile preparation, and more particularly, to systems and methods associated with carbon fiber tow preform fabrication.

BACKGROUND

Conventional carbon fiber preform processing currently includes net-shaped preforms using a circular needle loom (CNL). However, incorporating orthogonal (rectangular) structures into circular systems/structures as is commonly done may create waste products. For instance, disc shapes may be punched from a rectangular fabric or composite, generally having orthogonal weaves. The scrap from this punch process is generally waste material that has undergone many preprocessing activities. It would be desirable to reduce the creation of waste products.

SUMMARY

According to various embodiments, an optimized fiber tow orientation, to achieve substantially uniform fiber tow volume across the web, e.g., from inner diameter (ID) to the outer diameter (OD) of a disc shaped preform, without substantially varying the angles of the plurality of fiber tows radially or circumferentially is described herein. Utilizing the systems and processes described herein, a net shape preform may be created. A substantially continuous fiber tow may be used to form each layer of the preform and/or the preform. The fiber tow angle of each fiber tow may vary, from more radial, such as at the ID, to more tangential, such as at the OD, as the radius increases, such that there is substantially uniform thickness and substantially uniform areal weight from ID to OD of the preform or layer.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified. Further, because the disclosed fibers, tows and yarns (and their orientations) in practice are very small and closely packed, the figures herein may show exaggerated and/or idealized fiber width and spacing in order to more clearly illustrate the fiber orientations and shape of the bundles.

DETAILED DESCRIPTION

Figure 1A:
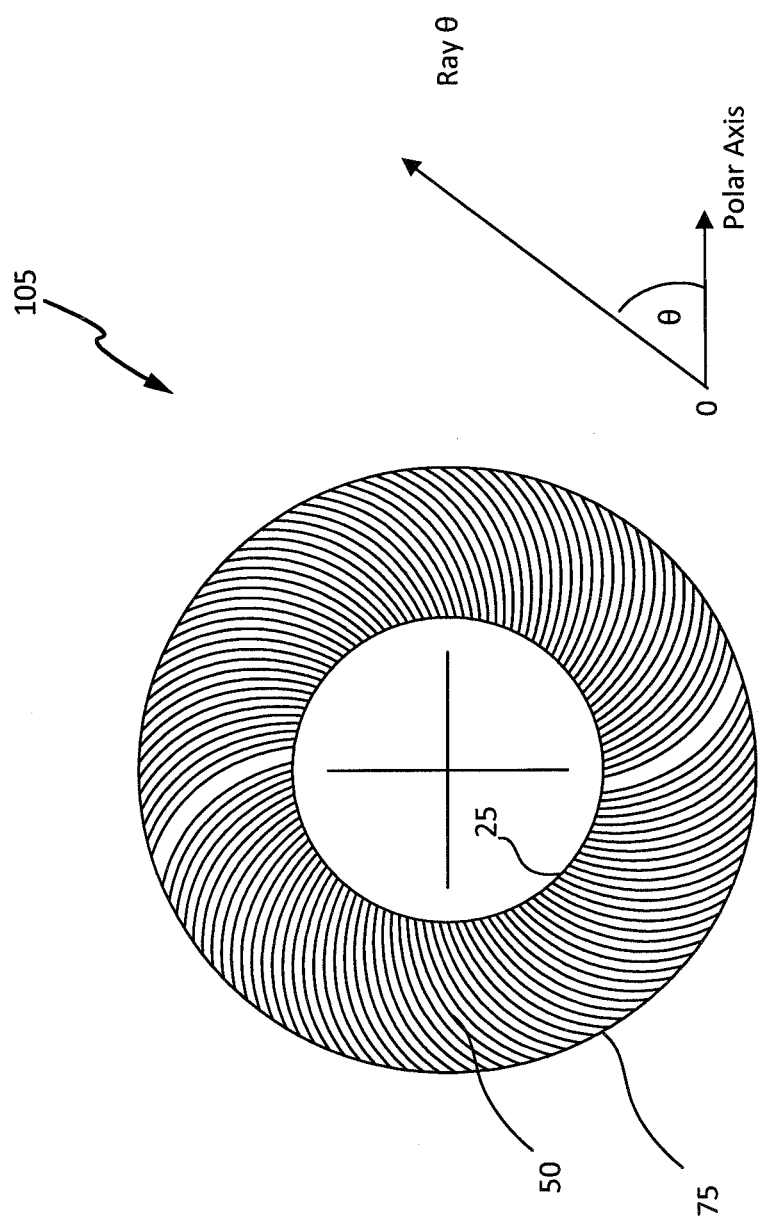
FIG. 1A illustrates a fiber tow angle varying from ID to OD in a preform uni-directional layer for substantially uniform areal weight and thickness according to various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

Carbon-carbon C/C material is generally formed by utilizing continuous oxidized polyacrylonitrile (PAN) fibers, referred to as "OPF" fibers. Such OPF fibers are the precursors of carbonized PAN fibers and are used to fabricate a preformed shape using a needle punching process. OPF fibers are layered in a selected orientation into a preform of a selected geometry. Typically, two or more layers of fibers are layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

As used herein, the terms "tow" and "cable" are used to refer to one or more strands of substantially continuous filaments. Thus, a "tow" or "cable" may refer to a plurality of strands of substantially continuous filaments or a single strand of substantially continuous filament. "Spiral" fabric may also be referred to herein as "helical" fabric. A "textile" may be referred to as a "fabric" or a "tape." A "loom" may refer to any weaving device, such as a narrow fabric needle loom.

As used herein, the term "ribbon" is used to refer to a closely packed bundle of continuous filaments generally delivered from a spool. A "span" as used herein may be a length of ribbon and/or tow. As used herein, the term "yarn" is used to refer to a strand of substantially continuous fibers or staple fibers or blends of these; thus the term "yarn" encompasses tow and cable. As used herein, the unit "K" represents "thousand." Thus, a 1K tow means a tow comprising about 1,000 strands of substantially continuous filaments. For example, a "heavy tow" may comprise about 48,000 (48K) textile fibers in a single tow, whereas a "medium tow" may comprise about 24,000 (24K) textile fibers within a single tow whereas a "lighter tow" may comprise about 6,000 (6K) textile fibers within a single tow. Fewer or greater amounts of textile fibers may be used per cable in various embodiments. In various embodiments disclosed herein, fabrics in accordance with various embodiments may comprise tows of from about 0.1K to about 100K, and, in various embodiments, heavier tows. As is understood, "warp" fibers are fibers that lie in the "warp" direction in the textile, i.e., along the length of the textile. "Weft" fibers are fibers that lie in the "weft" direction in the textile, i.e., along the width of the textile. Warp fibers may be described as being spaced apart with respect to the weft direction (i.e., spaced apart between the outer diameter (OD) and inner diameter (ID) of the textile). Similarly, the weft tows may be described as being spaced apart with respect to the warp direction. As used herein, the term "length of tows" may be used to refer to a continuous tow measured from an ID towards the OD of a layer of preform.

In various embodiments, any combination of warp and weft tow size may be used. For example, 48K warp tows may be used with 24K weft tows. Also for example, other combinations of warp tows to weft tows include: 48K:12K, 24K:24K, and 24K:12K. A ribbon/carbon fiber tow may be wrapped around a round spool for ease of transport and feeding into a weaving apparatus for fabricating a fabric which is used in a subsequent preforming process using needle punching. The ribbon on the spool comprises a generally closed packed rectangular cross sectional shape. A length of ribbon may be delivered from the spool to the weaving apparatus. In response to being manipulated under tension by a weaving apparatus, the generally rectangular shaped cross section of the ribbon changes to a generally oval shaped cross section. This oval shaped cross section is undesirable and a preferred approach is to spread the ribbon in the Y direction to increase the width, W, of the ribbon to increase coverage and reduce fiber volume. The ribbon may be spread mechanically through passage over and under specially shaped bars. In the alternative, the ribbon may be spread via vacuum suction or through ultrasonic vibration.

According to various embodiments, an optimized fiber tow orientation, to achieve substantially uniform fiber tow volume across the web, e.g., from inner diameter (ID) to the outer diameter (OD), without varying the circumferential fiber tows radially, without including partially extended radial fibers. Utilizing the systems and processes described herein, a net shape preform may be created. Stated another way, a net shape preform may be created through the additive addition of individual fiber tows in each layer of the preform. A substantially continuous fiber tow may be used to form the preform. The fiber tow angle may vary, from more radial, such as at the ID, to more tangential, such as at the OD, as the radius increases, such that there is substantially uniform thickness and substantially uniform areal weight from ID to OD of the preform or layer.

Historically, if a yarn or fiber tow is laid radially to form a disc shaped preform layer from ID to OD, gaps between the fiber tows occur the farther from the ID. Stated another way, when viewed with respect to unit areal weight, e.g., the amount of mass per area, extending from the inner diameter to the outer diameter, the fiber tow volume and/or the areal weight decrease due to larger gaps between the adjacent fiber tows. Alternatively, overlapping occurs at the ID which leads to uneven surfaces. A consistent areal weight across the layer of disc is preferred. For instance, during a chemical vapor infiltration/chemical vapor deposition process carbon may be deposited onto fiber tows. However, if no fiber tows are present, such as in the case of a gap, then the carbon deposition process is stymied. This may create a pore in the carbon-carbon composite. Pores in a carbon-carbon composite can collect debris, fluid, gas, etc., and pores may lead to oxidation. Conventional attempts to reduce these issues may include layering sectors of a disc shape preform from a two dimensional fabric cut from another shape, such as a rectangular shaped piece of fabric. These sectors may be overlapped or abutted as desired. Discontinuities may result from the joint locations of two abutted sectors and/or at the overlapping layers. A layer of a preform where discontinuities are observed likely results in a non-uniform areal weight. For instance, in the case where two sectors overlap by half an inch, in that half an inch area the areal weight is double that of the rest of the layer. This may create high spots and low spots in the layer. Also, in the case of abutted sectors, if the abutted areas are layered the composite strength is greatly reduced.

According to various embodiments, a substantially continuous fiber tow may be used to form the preform and/or each layer of a preform stack. Discontinuities may be a negative in that could a discontinuity could become a void after a CVI/CVD process. Thus, discontinuities could affect wear and/or mechanical strength of the resulting materials. A composite whose fiber tow orientation is repeatable, as described herein, reduces sources of variation. This may lead to better performance and/or consistency in the finished product.

Fiber tow textile angles may be optimized for both friction and for mechanical strength. Also, the design allows for substantially uniform gas flow paths of substantially uniform location and sizing to be located in desired locations, such as between adjacent fiber tows.

In practice, a fiber tow, such as a continuous fiber tow, may be laid onto a substrate and/or to a sacrificial layer in a particular orientation to form a layer. The fiber tow layer may be held in place with adhesive. The fiber tow layer may be held in place through air entangling. The fiber tows of the first layer may each angle towards the clockwise direction and the fiber tows of the next layer may be angled towards the counterclockwise direction. In this way, adjacent layers may be mirror images, with respect to the angles of the fiber tows within each layer. This stacking of dissimilarly angled layers may result in a preform of increased strength, as depicted in FIG. 1B. In this way, similar to an additive manufacturing technique, by controlling the placement and orientation of the each fiber tow, a constantly varying fiber tow angle across a layer of fiber tows may be used to create a substantially uniform ID 25 to OD 75 in a net shape (e.g., annular disc and/or annulus) preform. As each length of fiber tow 50 is placed on a layer of preform, a subsequent length of fiber tow 50 may be located at angle theta plus π (PI) at oriented at the uniform angle which varies from ID 25 to OD 75 (see FIG. 1A and FIG. 2). According to various embodiments, fiber tow lengths may be a portion of a continuous (non-broken) fiber tow.

Figure 1B:
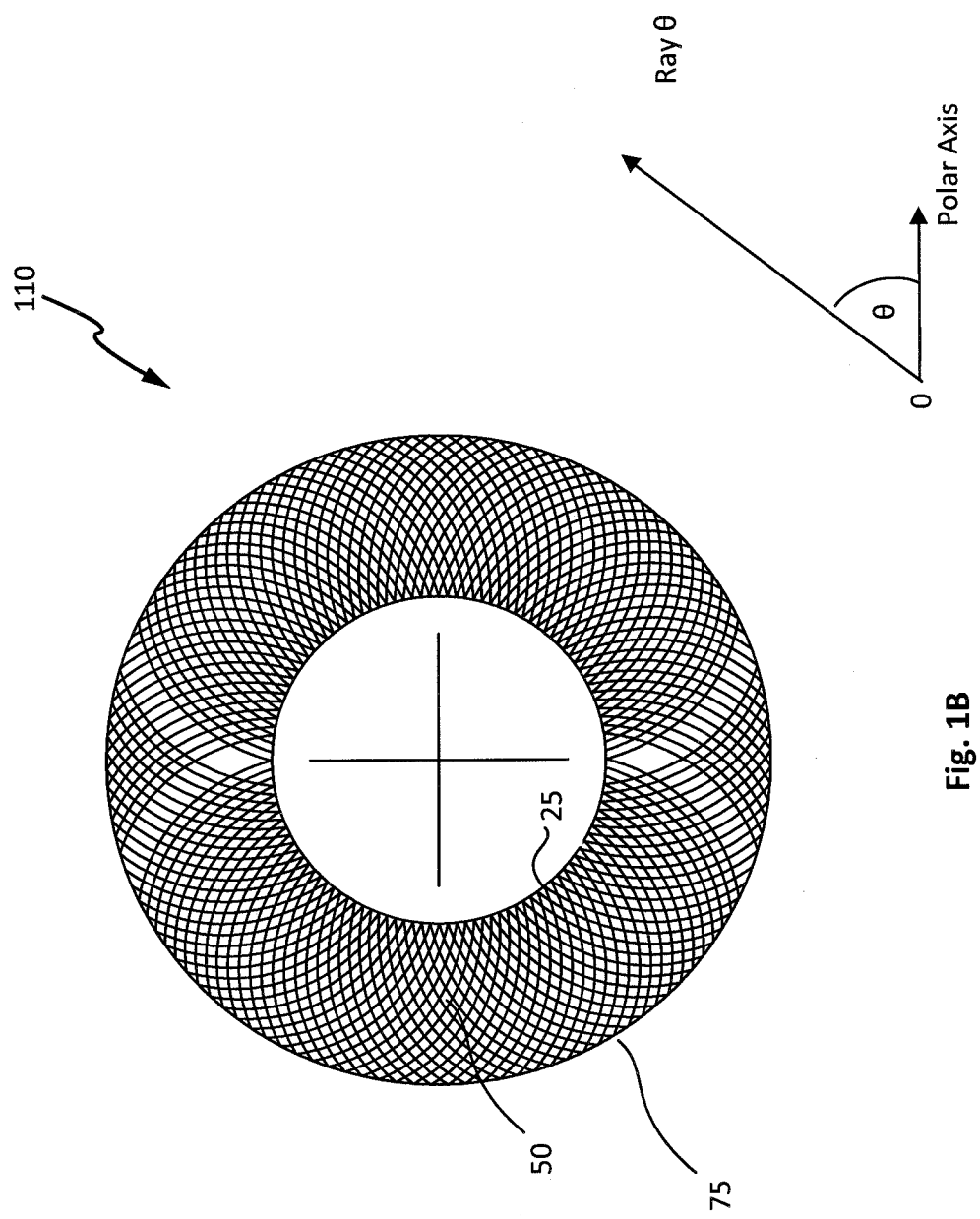
FIG. 1B illustrates a fiber tow angle in a fabric, varying from ID to OD in a preform for substantially uniform areal weight and thickness according to various embodiments.

A preform layer 105 according to various embodiments demonstrating the fiber tow angle of a length of fiber tow 50 varying from ID 25 to OD 75 in a preform uni-directional layer for substantially uniform areal weight and substantially uniform thickness is depicted in FIG. 1A. Referring to FIG. 1B, a preform 110 according to various embodiments demonstrating the fiber tow angle of lengths of fiber tow 50 in a fabric, varying from ID 25 to OD 75 in a preform for substantially uniform areal weight and thickness is depicted.

Figure 2:
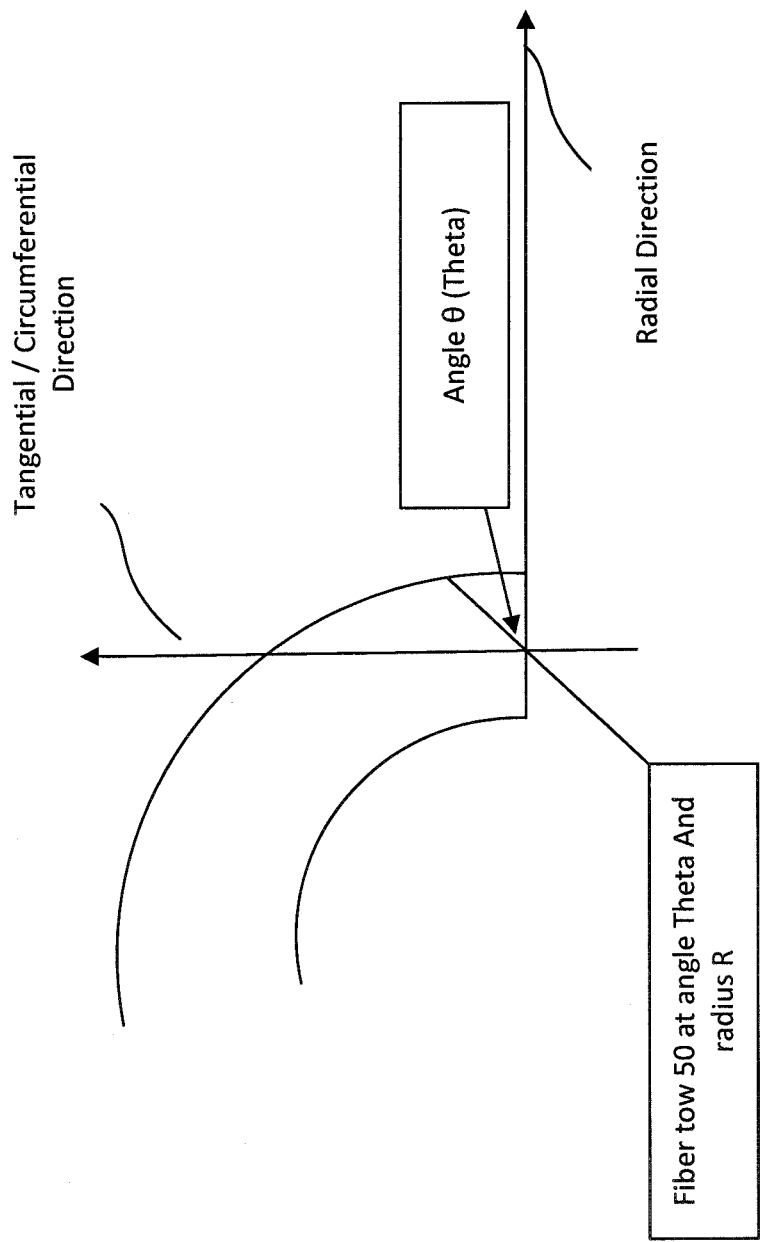
FIG. 2 illustrates a fiber tow at angle theta and at radius (R) according to various embodiments.
Figure 3:
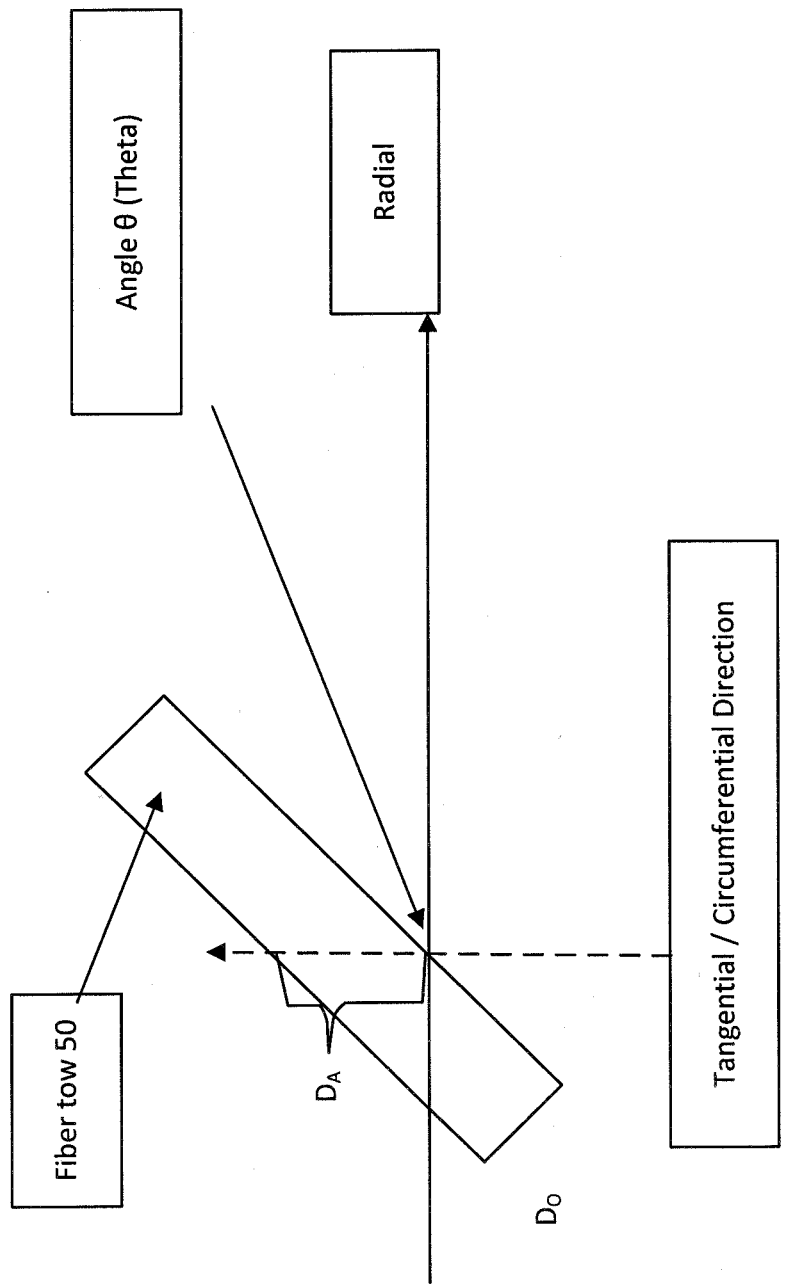
FIG. 3 illustrates a close up view of the fiber tow of FIG. 2 according to various embodiments.
Figure 4:
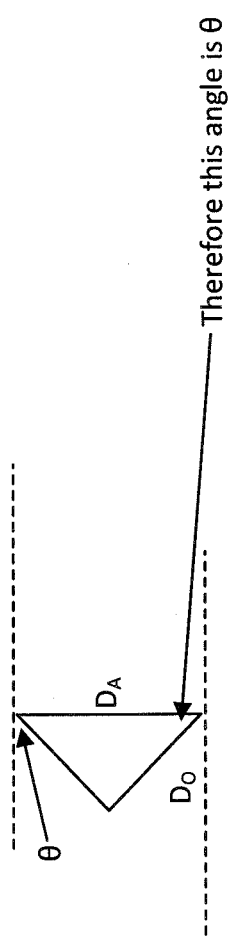
FIG. 4 Depicts $D_A$, which is a fiber tangential tow cross-sectional width at angle theta ($\theta$) and radius (R) according to various embodiments.

According to various embodiments, and with reference to FIGS. 2-4, the calculation for a fiber tow angle theta (θ) that varies as it moves outward radially from ID 25 to OD 75, in order to achieve substantially uniform thickness and substantially uniform areal weight is disclosed herein and below.

R—Radius of a hypothetical cross-sectional ring in a Brake Disk $D_O$—Fiber tow diameter $D_A$—Fiber tow cross-sectional width at angle theta ($\theta$) and radius (R)

$X_O$—fiber tow cross-sectional area based on fiber tow diameter (D)

$X_A$—fiber tow cross-sectional area at angle theta ($\theta$)

$\theta$—Angle of fiber tow with respect to radial direction

C—Circumference (distance) at radius (R)

$C_A$—Circumferential area at radius (R) with fiber tow diameter (D) height $F_O$—# Fiber tows chosen to be placed circumferentially in a single layer ($F_O$ is less than $F_{max}$ or wrinkles and/or overlaps will occur). Stated another way, fiber tows will overlap in the Z axis if $F_O$ is not less than $F_{max}$.

$F_{max}$—Maximum fiber tows that can be placed radially in a single layer at ID circumference $$X_O = D_O^2 = \qquad\qquad\qquad 1)$$

fiber tow cross-sectional area. For simplicity, one may assume the fiber tow is a square cross-sectional shape with the diameter of the fiber tow, D, equal to the length of the sides of the square.

$$X_A = D_O * D_A \qquad\qquad\qquad 2)$$

fiber tow cross sectional area sliced at a circumferential angle: rectangle approximately.

$$\text{Angle } \theta = \qquad\qquad\qquad 3)$$

Angle of fiber tow (with respect to radial direction)

$$C = 2*PI*R \qquad\qquad\qquad 4)$$

(circumference)

$$C_A = 2*PI*R*D_O \qquad\qquad\qquad 5)$$

(outside area of a hypothetical ring with ring height ($D_O$))

$$F_O = (C)/(D_A) \qquad\qquad\qquad 6)$$

$F_O = (2*PI*R)/(D_A)$ (number of adjacent fiber tows, at angle ($\theta$), at radius (R) that fit within a circumference)

$$F_{max} = (2*PI*R_{ID}))/(D_O) \qquad\qquad\qquad 7)$$

(at the ID only) (Maximum # of adjacent fiber tows at ID circumference) (note: fiber tows will generally be in more radial direction at the disk ID; however, for the purposes of this equation only, it is defined as being radial at the ID.)

$$D_O = D_A * \cos(\theta) \qquad\qquad\qquad 8)$$

$$\text{Therefore, } D_A = D_O/\cos(\theta) \qquad\qquad\qquad 9)$$

(i.e., the circumferential cross-section is equal to fiber tow diameter/cosine of the fiber tow angle)

Given equation number 6 above and number 9 above:

$$F_O = (2*PI*R)/(D_A) \text{ and}$$

$$D_A = D_O/\cos(\theta)$$

Therefore, substituting the equation $D_A$ into equation number 6:

$$F_O = (2*PI*R)/(D_O/\cos(\theta))$$

(note $F_O$ is less than or equal to $F_{max}$)

Simplifying:

$$F_O = [(2*PI*R)*\cos(\theta)]/(D_O)$$

$$F_O = [(2*PI*R)*\cos(\theta)]/(D_O)$$

yields the number of fiber tows (at angle theta ($\theta$) and radius (R)) that will fit in a circumference of radius R. Using this equation and the concepts disclosed herein, an initial ID fiber tow angle may be selected such that the number of fiber tows to use may be determined. This calculation may be used to start at the OD of the preform and work inward too, if the OD fiber tow angle is most critical. The larger the fiber tow diameter, the fewer number of fiber tows that will fit onto a circumference. In response to the number of fiber tows being determined, the fiber tow angle (as a function of radius (R)) can then be calculated from ID to OD:

Solving for Theta ($\theta$):

$$F_O * D_O = (2*PI*R)*\cos(\theta)$$

Then:

$$(F_O * D_O)/[2*PI*R] = \cos(\theta)$$

Yielding:

$$\theta = \cos^{-1}((F_O * D_O)/[2*PI*R])$$

$$\theta = \cos^{-1}((F_O * D_O)/[2*PI*R])$$

equation dictates the angle of the fiber tow at a given radius (R) (or in other words as a function of (R)) to achieve substantially uniform layer thickness and substantially uniform areal weight. Once the number of tows is chosen, and the fiber diameter is determined, these become constants in the equation and radius (R) becomes the only variable. This equation applies in various embodiments where it is desired that a layer have greater porosity and/or a repeating pattern of fibers that are not placed. In this way, higher porosity layers may benefit the densification process of C/C composites. For instance, the above equation may yield a maximum fiber tow placement strategy from which a total number of fiber tows laid in a desired orientation may be known. Individual fiber tows may be removed from a layer of the preform to achieve desired results. According to various embodiments, to assist gas flow paths and/or reduce the density of a layer of a stack of layers; a repeating pattern of tows may be omitted from being laid down in their calculated position. In this way, the layer may retain its symmetry. According to various embodiments, in lieu of removing tows, spaces and/or gaps of a desired repeating locations (e.g., between adjacent tows) may be introduced. These spaces and/or gaps may span from the ID to the OD of the layer between adjacent tows. For example, after every $5^{th}$ length a tow, a gap of any desired size, such as less than the width of a tow, may be introduced that repeats around the layer.

Similarly, an equation for the fiber tow angular position is contemplated herein. For instance, an angular fiber tow position may be numerically integrated as a function of fiber tow radial position and fiber tow angle. In this way, the fiber tow path may be fully described.

By varying the fiber tow angle as a function of the radial dimension, the circumferential cross-section of the fiber tow can be tailored to increase proportionately as the circumference increases. This yields the ability to make a substantially uniform thickness and substantially uniform areal weight preform. Similarly, by varying the fiber tow angle as a function of the radial dimension a substantially uniform fiber tow volume and substantially uniform preform thickness across the web may be achieved. The fiber tow angle and/or orientation of fiber tows may be optimized to account for lug locations. Stated another way, a first angle of orientation of fiber tow lengths and/or a second angle of orientation of the plurality of fiber tow lengths may be optimized for lug location strength. For example, strength in the shear direction at the lug locations will improve lug strengths. By resolving shear stress components, on the lugs, into tensile and compressive stresses, fiber orientations can further be optimized for strength.

The fiber tow angle and/or orientation of fiber tows may be optimized to account for friction and/or wear. For instance, the achieved planer layers may result in increased wear life. Using the concepts described herein, heavier OD circumferential fiber tows are not needed to balance out lower fiber volume in polar woven fabrics, and thus layers remain flat. By varying the fiber tow angle as a function of the radial dimension a higher fiber tow volume may be achieved as compared with standard polar woven preforms. According to various embodiments the fiber tows may be substantially continuous from ID to OD. Stated another way, there may not be discontinuous fibers ID to OD. Controlling the fiber tows angle results in much less waste material and/or is an efficient use of the fiber tows.

By optimizing fiber tows orientations for woven fabric, non-woven fabrics and/or unidirectional fabric, a substantially uniform fiber tow volume may be achieved across the web (from ID to OD) without the need for varying the circumferential fiber tows radially, or partial ID to OD (radial) fiber tow additions. Moreover, unlike conventional applications, a wide range of fiber tow sizes may be utilized which may lead to reduced overall cost. A higher filament count fiber tow, such as between about 20K-50K, may be utilized with acceptable results. In general, the higher filament count in the fiber tow, the less expensive fiber tow material cost from a vendor.

As stated above, the equations and/or concepts disclosed herein allow for fiber tows to be adjacent to one another or spaced at a desired/set distance to one another. The fiber tow angle of each fiber tow varies, from more radial (at the ID) to more tangential (at the OD) as the radius increases, such that there is substantially uniform thickness and areal weight from ID to OD of the preform or layer. The equations and/or concepts disclosed determine the angle and/or orientation of fiber tow to achieve the results contemplated herein. A desired OD angle, a desired ID fiber tow angle, the fiber tow cross-sectional diameter, the number of fiber tows in a complete circle may contribute to the result. The maximum number of fiber tows that will fit in a complete circle at the desired fiber angle may be determined. The number of fiber tows can be a number of fiber tow bundles, at the given spacing between fiber tows, which will fit in a complete circle at the desired fiber tow angle. In this way porosity my further be controlled/modified The equations and/or concepts described herein can be applied to any CNL preform concept, and/or any carbon fiber-reinforced carbon composite material concept. Stated another way, the equations and/or concepts described herein can be applied to OPF needling and/or carbon fiber needling. The equations and/or concepts can also be applied to the non-woven and non-needled stretch broken carbon fiber preform concepts. Circumferential fiber tows may be applied to the preform, though are not needed, for increased mechanical properties. Stated another way, the fiber tow angle concept may be practiced with or without circumferential fibers.

Although this disclosure illustrates and describes various embodiments, equivalents and modifications will occur to others who are skilled in the art upon reading and understanding of the disclosure. For instance, the techniques and methods disclosed herein are applicable to woven fabrics. Various embodiments include all such equivalents and modifications, and are limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A layer of a preform comprising:
   a first angle of orientation of a plurality of fiber tow lengths measured at an inner diameter of an annular disc shaped layer of the preform, wherein the first angle of orientation of the plurality of fiber tow lengths is repeated in a circular progression around an inner circumference of the annular disc shaped layer of the preform; and
   a second angle of orientation of the plurality of fiber tow lengths measured at an outer diameter of the annular disc shaped layer of the preform, wherein the second angle of orientation of the plurality of fiber tow lengths is repeated in a circular progression around an exterior circumference of the annular disc shaped layer of the preform,
   wherein adjacent fiber tows of the plurality of fiber tow lengths are each spaced apart at a substantially uniform distance;
   wherein the first angle of orientation of the plurality of fiber tow lengths is more radial as compared with the second angle of orientation of the plurality of fiber tow lengths, wherein the layer of preform comprises a first layer of a plurality of stacked annular disc shaped layers of the preform, each additional layer of the plurality of stacked annular disc shaped layers having the first angle of orientation of the plurality of fiber tow lengths and the second angle of orientation of the plurality of fiber tow lengths, and wherein adjacent layers of the first layer and the additional layer of the plurality of stacked annular disc shaped layers of the preform are oriented such that the plurality of fiber tow lengths of the adjacent layers are laid in alternating counter-clockwise orientation and clockwise orientation with respect to the first angle of orientation of the plurality of fiber tow lengths and the second angle of orientation of the plurality of fiber tow lengths.

2. The layer of the preform of claim 1, wherein the annular disc shaped layer comprise a substantially uniform fiber volume across the annular disc shaped layer.

3. The layer of the preform of claim 1, wherein a net shape preform is created through additive addition of individual fiber tows.

4. The layer of the preform of claim 1, wherein a substantially continuous fiber tow is used to form the layer of the preform.

5. The layer of the preform of claim 1, wherein the annular disc shaped layer comprises substantially uniform thickness.

6. The layer of the preform of claim 1, wherein the annular disc shaped layer comprises substantially uniform areal weight.

7. The layer of the preform of claim 1, wherein an equation $\theta=\cos-1((FO*DO)/[2*PI*R])$ defines an angle of orientation of the plurality of fiber tow lengths with respect to a radial direction as a function of R to achieve a substantially uniform areal weight.

8. The layer of the preform of claim 1, wherein a length of the plurality of fiber tow lengths is substantially continuous from the inner diameter of the annular disc shaped layer of the preform to the outer diameter of the annular disc shaped layer.

9. The layer of the preform of claim 1, wherein the preform comprises a carbon fiber-reinforced carbon composite material.

10. A net shaped preform comprising:
a needled stack of layers of fiber tows, where the stack of layers form an annular disc shape, each layer of the stack of layers of fiber tows comprising:
a substantially uniform areal weight across each layer;
a repeated angular first fiber tow angle of a plurality of fiber tows around an inner circumference of each layer; and
a repeated angular second fiber tow angle of the plurality of fiber tows around an outer circumference of each layer,
wherein the repeated angular first fiber tow angle is more radial as compared with the repeated angular second fiber tow angle,
wherein adjacent layers of the stack of layers of fiber tows are oriented such that the plurality of fiber tows of the adjacent layers are laid in alternating counter-clockwise orientation and clockwise orientation with respect to the first angle of orientation of the plurality of fiber tows and the second angle of orientation of the plurality of fiber tows.

11. The net shaped preform of claim 10, wherein an equation $\theta=\cos-1((FO*DO)/[2*PI*R])$ defines an angle of orientation of the plurality of fiber tows with respect to a radial direction as a function of R to achieve a substantially uniform areal weight.

* * * * *